Feb. 13, 1951     E. ZANI     2,541,491
OIL AND WATER SEPARATOR
Filed Nov. 28, 1947
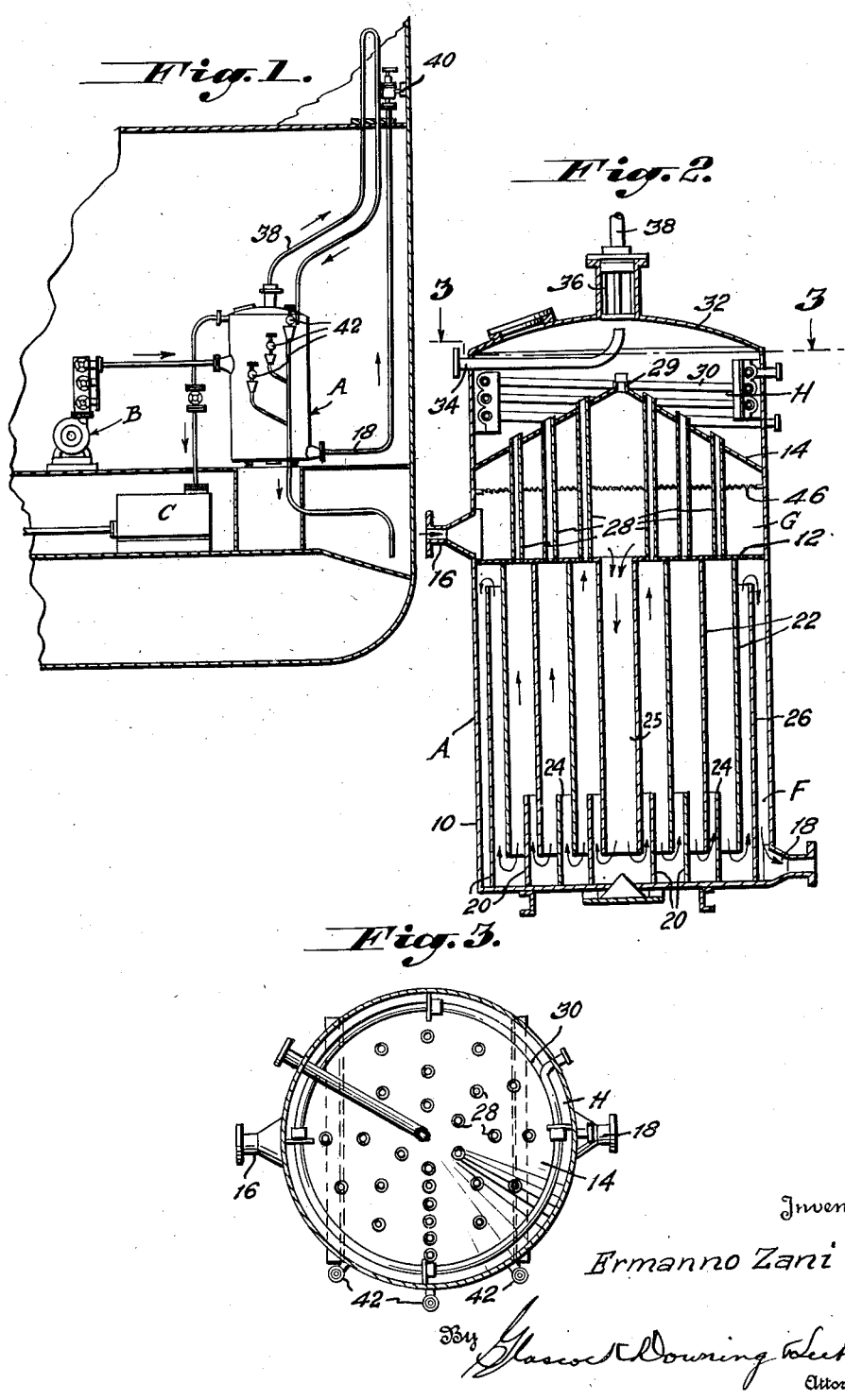
Inventor,
Ermanno Zani Patented Feb. 13, 1951

2,541,491

UNITED STATES PATENT OFFICE 2,541,491

OIL AND WATER SEPARATOR

Ermanno Zani, Monfalcone, Italy, assignor to Cantieri Riuniti Dell 'Adriatico, S. A., Trieste, a limited company Application November 28, 1947, Serial No. 788,618
In Italy December 11, 1946

3 Claims. (Cl. 210—43)

The device which forms the object of the present invention can be installed on board ship and is used to recover and separate the oil contained in bilge or ballast water. The two fluids thus separated will therefore be oil-free water and water-free oil.

The device is characterized by a pressure vessel divided into three compartments arranged one above the other, in the lowest of which are lodged two sets of coaxial and oppositely arranged tube-shaped baffles, the lower of which project from the bottom wall while the upper project from the top wall of the lower compartment, their free edges lying in staggered overlapping relationship so as to form annularly disposed passages through which the water under treatment runs, such chambers being provided on top with vertical conduits which, going through the middle compartment into which the water under treatment is caused to flow, end in the upper compartment where the oil, separated from water, is collected; the said last compartment being provided with suitable heating means for facilitating the separation of the water that may be present in the oil and with control means for the liquid.

The drawings herewith annexed, which are given only by way of example and are not meant to limit the invention's range, illustrate one preferred form of embodiment of the device according to the invention. In these drawings Fig. 1 shows diagrammatically the installation of the device aboard ship, Figs. 2 and 3 show the actual device, respectively in vertical and horizontal cross-section, the latter on line 3—3 of Fig. 2.

With reference to Fig. 1, A shows the device according to the invention, B is a feed pump and C a collecting tank.

The device A consists of a closed vessel 10 divided on the inside by partitions 12 and 14 into three compartments F, G and H, arranged one above the other.

A fitting 16 is arranged near the bottom 12 of the middle compartment G, such fitting leading to the pump B and through which flows the water under treatment, which is discharged, as it will be explained later, from a bottom fitting 18 arranged at the bottom of the lower compartment F.

Two series of rings shaped baffles 20 and 22, which are coaxial to one another and designed so as to form labyrinth passages 24, are arranged in the lower chamber F.

A central conduit means 25 is fixed, together with the ring baffles 22, to the lower surface of the bottom 12 of the middle compartment G. Said conduit means 25 communicates, through a central hole cut in the said bottom 12, with said middle compartment G, so that the liquid under treatment and entering into the middle compartment through the fitting 16 may flow in succession and in radial direction through the ring chambers limited by the ring-shaped baffles 20 and 22 and then passes the outlet 18, going through a ring-shaped jacket formed by a suitable high baffle 26 and by the wall of vessel A.

Each one of the ring chambers limited by baffles 22 is in communication with the upper compartment H by means of vertical conduits 28, which extend through the middle compartment G. The bottom of the upper compartment H has the shape of an inverted funnel provided at its vertex with a short tube 29, while the tubes 28 are arranged following concentric circumferences.

In the middle compartment G, above the inlet port 16, there is arranged a baffle means 46, which may comprise a net having a large mesh, for the purpose of preventing swirling movements in the water entering the inlet 16, and to maintain the water lying in the compartment above the baffle means in an undisturbed condition as it passes through the tube 28 into compartment H.

A coil 30 is arranged in the upper compartment H and into said coil flows steam which warms up the recovered oil of which the last water particles are eliminated. A topping tube 34 is arranged near the lid 32 of compartment H and discharges the oil which has been recovered into the tank C.

In the upper part of lid 32 a float valve 36 is arranged to discharge the air during the start of operation, as well as any air which may become entrapped in the vessel after it is filled with liquid, the said air being led to a test funnel through tube 38.

The air discharging from fitting 18 flows outboard through a bulwark valve 40 (Fig. 1).

It is obvious that the pump forces the water into the middle compartment G; said water goes then through the labyrinth passages 24 into the ring chambers which have just been described. The oil which floats in compartment G passes into the upper compartment H through the center tube 29 arranged at the vertex of the reverse funnel 14.

On the other hand the oil separated in the ring chambers limited by ring baffles 22 collects in the upper part of said chambers and, through the vertical tubes 28, collects in the upper compartment H, whence it is discharged, as already stated, into tank C. The thickness of the oil layer collected in the upper compartment H is determined by means of the test cock 42.

At any time during operation of the apparatus, if water is mixed with the air, the latter is discharged by means of float valve 36 and will flow towards the outside through tube 38, while the water that then passes in said tube will be revealed by the test funnel. After the air in the tank has been eliminated, valve 36 cuts off the passage.

The device according to the invention can be mounted on the ship in the most convenient position in the engine rooms or in other rooms, above or under the water line.

What I claim is:

1. In an oil and water separator operating under pressure for shipboard installations, comprising in combination, a pressure vessel divided by upper and lower partitions into upper, lower, and middle compartments arranged in superposed relationship, two sets of tubular shaped spaced baffles in the lower compartment, one set depending from the said lower partition the other set projecting from the bottom wall of said lower compartment, the lower compartment being in communication with the middle compartment through an opening provided in the center of the lower partition and also by means of duct means extending between openings provided in the upper and lower partitions, said upper partition being formed in the shape of an inverted funnel and provided at its vertex with an opening for communication between the upper and middle compartments, heating means for the upper compartment, inlet means for the contaminated water being provided in the side of the middle compartment, an outlet for scavenged water provided in the side of the lower compartment, and outlet means in the upper compartment for drawing off recovered oil from the center of the compartment.

2. A device as claimed in claim 1, in which the upper set of baffles in the lower compartment are greater in length than the lower set of baffles, the free edges of one set of baffles being disposed in staggered spaced relationship to the free edges of the other set so as to create a labyrinth passage for the water entering at the center from the middle compartment and traveling radially outwardly toward the outlet in the lower compartment.

3. A device as claimed in claim 1, having drain cocks provided at different levels in the pressure vessel for sampling the contained liquid in the several compartments and float valve means provided in the upper compartment to allow the discharge of air from the vessel.

ERMANNO ZANI.

REFERENCES CITED

The following references are of record in the file of this patent:

UNITED STATES PATENTS

| Number | Name | Date |
|---|---|---|
| 1,290,820 | Ten Winkel | Jan. 7, 1919 |
| 1,559,207 | Van Ringelenstein et al. | Oct. 27, 1925 |
| 1,711,829 | Boon | May 7, 1929 |
| 1,775,362 | Demarcus | Sept. 9, 1930 |
| 1,921,689 | Meurk | Aug. 8, 1933 |
| 2,104,050 | Nibecker et al. | Jan. 4, 1938 |
| 2,175,563 | Green et al. | Oct. 10, 1939 |